US010621997B2

(12) United States Patent
Iwase et al.

(10) Patent No.: US 10,621,997 B2
(45) Date of Patent: Apr. 14, 2020

(54) INFORMATION PROVIDING SYSTEM, INFORMATION PROVIDING METHOD, AND COMPUTER-READABLE RECORDING MEDIUM

(71) Applicant: YAMAHA CORPORATION, Hamamatsu-shi (JP)

(72) Inventors: Hiroyuki Iwase, Tokyo (JP); Yuki Seto, Tokyo (JP); Takahiro Iwata, Tokyo (JP); Shota Moriguchi, Tokyo (JP); Tetsuro Ishida, Tokyo (JP); Yumiko Ochi, Hong Kong (CN)

(73) Assignee: YAMAHA CORPORATION, Hamamatsu-Shi (JP)

( * ) Notice: Subject to any disclaimer, the term of this patent is extended or adjusted under 35 U.S.C. 154(b) by 10 days.

(21) Appl. No.: 15/827,615

(22) Filed: Nov. 30, 2017

(65) Prior Publication Data
US 2018/0082697 A1 Mar. 22, 2018

Related U.S. Application Data

(63) Continuation of application No. PCT/JP2016/066660, filed on Jun. 3, 2016.

(30) Foreign Application Priority Data

Jun. 24, 2015 (JP) ................. 2015-126736

(51) Int. Cl.
*G10L 15/02* (2006.01)
*G10L 19/018* (2013.01)
(Continued)

(52) U.S. Cl.
CPC ........ *G10L 19/018* (2013.01); *B61L 15/0027* (2013.01); *G06F 3/167* (2013.01);
(Continued)

(58) Field of Classification Search
CPC combination set(s) only.
See application file for complete search history.

(56) References Cited

U.S. PATENT DOCUMENTS 8,942,388 B2 1/2015 Akiyama et al.
9,558,747 B2 * 1/2017 Kore ................ G10L 13/00
(Continued)

FOREIGN PATENT DOCUMENTS

EP 3223275 A1 9/2017
JP H03175478 A 7/1991
(Continued)

OTHER PUBLICATIONS

International Search Report issued in Intl. Appln. No. PCT/JP2016/066660 dated Aug. 9, 2016. English translation provided.
(Continued)

*Primary Examiner* — Abul K Azad
(74) *Attorney, Agent, or Firm* — Rossi, Kimms & McDowell LLP

(57) ABSTRACT

An information providing system (1) has a sound receiver (22) that receives a guidance voice and generates a sound signal ($S_G$); a text identifier (114) that identifies, from among registered texts representing contents of utterances of different guidance voices, a registered text that is similar to an uttered text (L) that represents a content of an utterance of one of the guidance voices (V), the uttered text having been obtained by analyzing the sound signal ($S_G$) by use of speech recognition, and a sound outputter (26) that transmits distribution information (D) that indicates the registered text identified by the text identifier (114) to a terminal device capable of presenting to a user (U) guidance information (G) corresponding to the distribution information (D) from among pieces of guidance information (G) that correspond to the respective guidance voices.

11 Claims, 9 Drawing Sheets

(51) Int. Cl.
| | |
|---|---|
| *G10L 21/10* | (2013.01) |
| *G06F 3/16* | (2006.01) |
| *B61L 15/00* | (2006.01) |
| *G06F 40/289* | (2020.01) |
| *G10L 13/02* | (2013.01) |
| *G10L 15/26* | (2006.01) |
| *G10L 21/06* | (2013.01) |
| *G10L 15/20* | (2006.01) |
| *H04M 1/725* | (2006.01) |

(52) U.S. Cl.
CPC ............ *G06F 40/289* (2020.01); *G10L 13/02* (2013.01); *G10L 15/26* (2013.01); *G10L 21/10* (2013.01); *G06F 3/16* (2013.01); *G10L 15/20* (2013.01); *G10L 2021/065* (2013.01); *H04M 1/72591* (2013.01)

(56) References Cited

U.S. PATENT DOCUMENTS

| | | | | |
|---|---|---|---|---|
| 2004/0006547 | A1* | 1/2004 | Dehlinger | G06F 16/313 |
| 2009/0197224 | A1* | 8/2009 | Nariyama | G09B 5/04 |
| | | | | 434/156 |
| 2016/0019895 | A1* | 1/2016 | Poisner | H04W 4/12 |
| | | | | 455/466 |

FOREIGN PATENT DOCUMENTS

| | | |
|---|---|---|
| JP | H09146585 A | 6/1997 |
| JP | 2001272246 A | 10/2001 |
| JP | 2005333599 A | 12/2005 |
| JP | 2006039382 A | 2/2006 |
| JP | 2006240826 A | 9/2006 |
| JP | 2007158789 A | 6/2007 |
| JP | 2010083378 A | 4/2010 |
| JP | 2012063611 A | 3/2012 |
| JP | 2014075067 A | 4/2014 |
| WO | 2010016589 A1 | 2/2010 |

OTHER PUBLICATIONS

Written Opinion issued in Intl. Appln. No. PCT/JP2016/066660 dated Aug. 9, 2016.

Extended European Search Report issued in European Application No. 16814137.2 dated Jan. 2, 2019.

Office Action issued in Japanese Appln. No. 2016-208761 dated Apr. 2, 2019. English translation provided.

Office Action issued in Japanese Appln. No. 2016-208761 dated Oct. 23, 2019. English translation provided.

\* cited by examiner

FIG. 3

| DISTRIBUTION INFORMATION D | REGISTERED TEXT X | $T_A$ |
|---|---|---|
| $D_1$ | $X_1$ : THANK YOU VERY MUCH | |
| $D_2$ | $X_2$ : PLEASE DON'T RUSH INTO THE TRAIN | |
| $D_3$ | $X_3$ : THE TRAIN IS AT A STOP DUE TO A RED LIGHT | |
| $D_4$ | $X_4$ : THE TRAIN WILL MAKE AN EMERGENCY STOP DUE TO AN ACCIDENT | |

FIG. 4

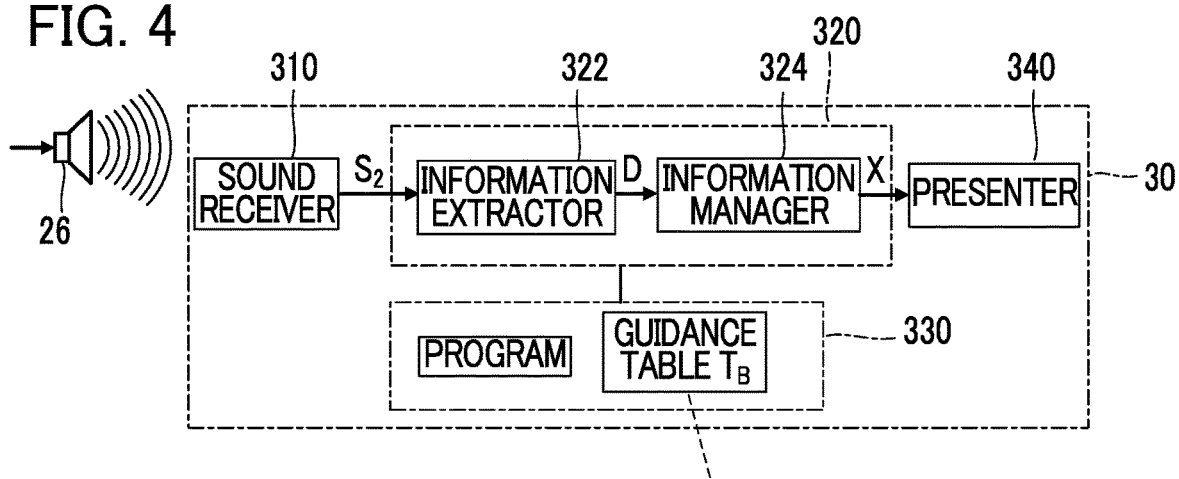

| DISTRIBUTION INFORMATION D | GUIDANCE INFORMATION G |
|---|---|
| $D_1$ | $G_1$ : THANK YOU VERY MUCH [=$X_1$] |
| $D_2$ | $G_2$ : PLEASE DON'T RUSH INTO THE TRAIN [=$X_2$] |
| $D_3$ | $G_3$ : THE TRAIN IS AT A STOP DUE TO A RED LIGHT [=$X_3$] |
| $D_4$ | $G_4$ : THE TRAIN WILL MAKE AN EMERGENCY STOP DUE TO AN ACCIDENT [=$X_4$] |

FIG. 5

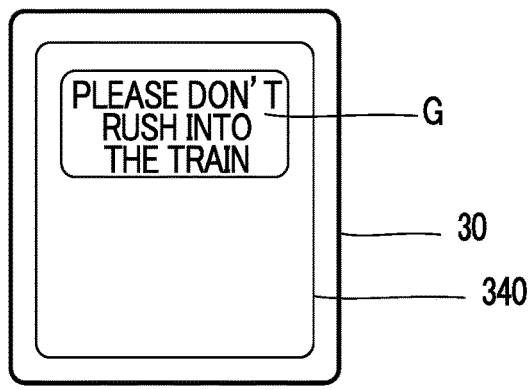

FIG. 9

| IDENTIFICATION INFORMATION $D_X$ | REGISTERED TEXT X |
|---|---|
| $D_{X1}$ | $X_1$ : THIS TRAIN IS BOUND FOR XX |
| $D_{X2}$ | $X_2$ : PLEASE DON'T RUSH INTO THE TRAIN |
| $D_{X3}$ | $X_3$ : THE TRAIN IS AT A STOP DUE TO A RED LIGHT |
| $D_{X4}$ | $X_4$ : THE TRAIN WILL MAKE AN EMERGENCY STOP DUE TO AN ACCIDENT |

$T_K$ — SPECIFIC REGISTERED TEXT $T_{A1}$

FIG. 10

| IDENTIFICATION INFORMATION $D_Y$ | PHRASE TO BE INSERTED Y |
|---|---|
| $D_{Y1}$ | $Y_1$ : MEJIRO |
| $D_{Y2}$ | $Y_2$ : SHINJUKU |
| $D_{Y3}$ | $Y_3$ : SHIBUYA |
| $D_{Y4}$ | $Y_4$ : EBISU |
| $D_{Y5}$ | $Y_5$ : MEGURO |

$T_{A2}$

INFORMATION PROVIDING SYSTEM, INFORMATION PROVIDING METHOD, AND COMPUTER-READABLE RECORDING MEDIUM

BACKGROUND OF THE INVENTION

Field of the Invention

The present invention relates to a technique for providing information to a user of a terminal device.

Description of the Related Art

Conventionally there have been proposed techniques for providing a variety of information to users based on results of speech recognition attained from a vocal utterance. For example, Japanese Patent Application Laid-open Publication H03-175478 discloses performing speech recognition of an utterance of a user's voice and specifying a display range and a display scale, etc., of a map with a target point at the center, the target point having been identified by use of speech recognition.

It would be convenient for a hearing-impaired person who has difficulty hearing a guidance voice, or for a foreigner who does not understand the language of the guidance voice, if speech recognition could be performed on the guidance voice broadcast on a public transportation service such as a train or a bus, and if guidance information including recognition texts or a translation thereof could be provided to such a passenger. In reality, however, it is difficult to achieve flawless speech recognition. For example, a recognition error may occur as a result of, for example, speech characteristics (habits) that are unique to the individual speaker, or as a result of occurrence of background noise during receipt of the voice.

SUMMARY OF THE INVENTION

Taking the above circumstances into consideration, the present invention has as an object provision to a user of appropriate guidance information in accordance with a guidance voice.

In one aspect, an information providing system of the present invention includes a sound receiver configured to receive a guidance voice and to generate a sound signal, a text identifier configured to identify, from among a plurality of registered texts representing contents of utterances of different guidance voices, a registered text that is similar to an uttered text that has been obtained by analyzing the sound signal by use of speech recognition, and an information transmitter configured to transmit distribution information that indicates the registered text identified by the text identifier to a terminal device, wherein the terminal device is configured to present to a user guidance information corresponding to the distribution information from among a plurality of pieces of guidance information that correspond to the respective guidance voices.

In another aspect, the information providing device according to the above-mentioned embodiments may also be realized as an information providing method that executes processes according to the different functions of the information providing device. In still another aspect, the information providing device may be realized as a program that causes a computer to execute such a method. More specifically, the information providing method in a computer system according to one aspect of the present invention includes receiving a guidance voice and generates a sound signal, identifying, from among a plurality of registered texts representing contents of utterances of different guidance voices, a registered text that is similar to an uttered text that has been obtained by analyzing the sound signal by use of speech recognition, and transmitting distribution information that indicates the registered text identified by the text identifier to a terminal device, wherein the terminal device is configured to present to a user guidance information corresponding to the distribution information from among a plurality of pieces of guidance information that correspond to the respective guidance voices.

Furthermore, a program according to one aspect of the present invention causes a computer to execute a sound reception process of receiving a guidance voice and generates a sound signal, a text identification process of identifying, from among a plurality of registered texts representing contents of utterances of different guidance voices, a registered text that is similar to an uttered text that has been obtained by analyzing the sound signal by use of speech recognition, and an information transmission process of transmitting distribution information that indicates the registered text identified by the text identifier to a terminal device, wherein the terminal device is configured to present to a user guidance information corresponding to the distribution information from among a plurality of pieces of guidance information that correspond to the respective guidance voices. The program according to the present invention may be installed in a computer in a computer-readable format on computer-readable recording media.

BRIEF DESCRIPTION OF THE DRAWINGS

FIG. 3 is a diagram of a guidance table.

FIG. 4 is a block diagram of a terminal device.

FIG. 5 is a display example of guidance information.

FIG. 9 is a diagram of a guidance table according to the second embodiment.

FIG. 10 is a diagram of a table of phrases to be inserted according to the second embodiment.

DESCRIPTION OF THE EMBODIMENTS

First Embodiment

Figure 1:
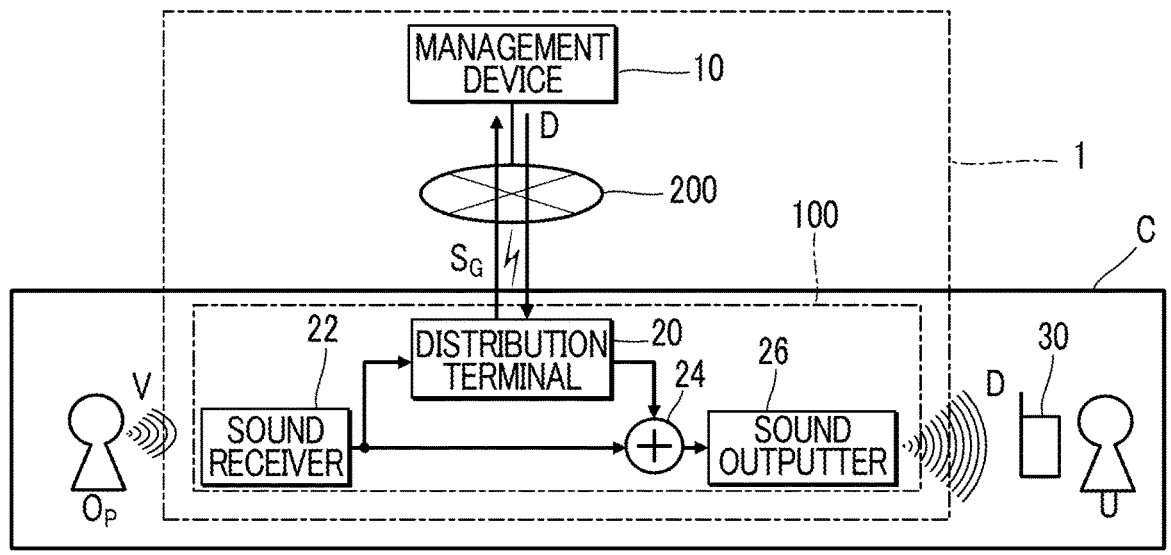
FIG. 1 is a schematic diagram of an information providing system according to a first embodiment of the present invention.

FIG. 1 is a block diagram of an information providing system 1 according to a first embodiment of the present invention. The information providing system 1 according to the first embodiment is a computer system for providing information to users U of a public transportation service such as a train or a bus. The information providing system 1 includes a voice guidance system 100 and a management device 10. The voice guidance system 100 is provided in a carriage C of, for example, a train or a bus, and communicates with the management device 10 via a communication network 200 that includes, for example, the Internet. The management device 10 is, for example, a server (e.g. a web server) connected to the communication network 200. Each user U riding in the carriage C carries a terminal device 30. The terminal device 30 is a portable information processing device, and may be a mobile phone, a smartphone, or the like. Although, in reality, a plurality of users U inside the carriage C are likely to be using the service provided by the information providing system 1, for the sake of convenience, in the following explanation the focus will be on a single terminal device 30.

An operator $O_P$, such as a driver or conductor of the carriage C, makes a voice utterance (hereinafter, a guidance voice) V to provide guidance on public transportation services. For example, a voice utterance that provides information on the operation of the carriage C, such as "Please do not rush into the train." or "The train is at a stop due to a red light.", is uttered, as the guidance voice V. In the first embodiment, a situation is assumed in which the operator $O_P$ selects and utters, as the guidance voice V, any one of a plurality of texts prepared in advance (hereinafter, registered texts).

The information providing system 1 transmits to the terminal device 30 information (hereinafter, distributed information) D that specifies, among a plurality of registered texts, a registered text corresponding to an utterance of the guidance voice V made by the operator $O_P$. The terminal device 30 presents to the user U guidance information corresponding to the distributed information D acquired from the information providing system 1. The guidance information is information related to the guidance voice V. In the first embodiment, a registered text is given as an example of the guidance information. That is, a single type of registered text, among the plurality of registered texts prepared in advance, that is specified by the distributed information D is presented to the user U as the guidance information. According to the above configuration, a hearing-impaired person, who has difficulty hearing the guidance voice V, is able to understand the content of the guidance voice V since the registered text representative of the spoken content of the guidance voice V, which has been uttered by the operator $O_P$, is presented to the user U as the guidance information.

Voice Guidance System 100

Figure 2:
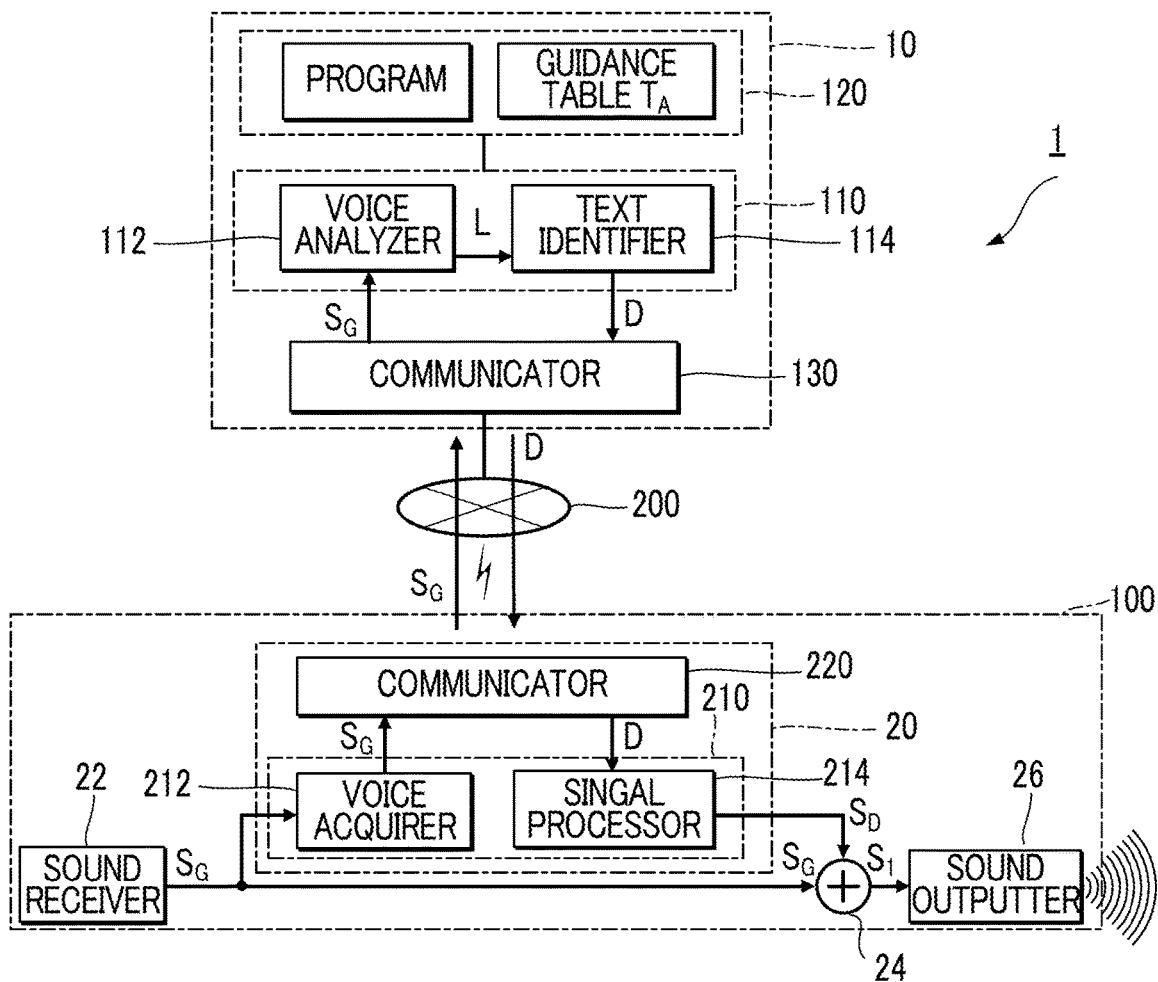
FIG. 2 is a block diagram of a voice guidance system and a management device.

FIG. 2 is a block diagram of the voice guidance system 100 and the management device 10. As shown in FIG. 2, the voice guidance system 100 is configured to include a distribution terminal 20, a sound receiver 22, an adder 24, and a sound outputter 26. The sound receiver 22 is an audio device (microphone) that receives surrounding sounds. The operator $O_P$ selects and utters, as the guidance voice V, for example in accordance with the status of the public transportation service, any one of a plurality of registered texts prepared and included in an announcement booklet in advance. In other words, the content of the guidance voice V according to the first embodiment is basically known content that is prepared in advance, and is not content that the operator $O_P$ is able to freely define. The sound receiver 22 according to the first embodiment receives the guidance voice V uttered by the operator $O_P$ and generates a sound signal $S_G$ that represents the time waveform of the guidance voice V. For convenience, an A/D converter, which converts the sound signal $S_G$ generated by the sound receiver 22 from analog to digital, is not shown in the figure.

The sound signal $S_G$ generated by the sound receiver 22 is supplied via the adder 24 to the sound outputter 26 as an audio signal $S_1$. The sound outputter 26 is an audio device (speaker) that outputs a sound corresponding to the audio signal $S_1$ supplied from the adder 24. For example, the sound of a guidance voice V represented by the sound signal $S_G$ is output from the sound outputter 26, for transmission to the user U. As will be understood from the above explanation, the voice guidance system 100 according to the first embodiment is an audio system that consists of the distribution terminal 20 and the adder 24 connected to a conventional onboard broadcasting system that broadcasts from the sound outputter 26 the guidance voice V received by the sound receiver 22. The form of the voice guidance system 100, however, may be freely chosen, and for example, the different elements of the distribution terminal 20, the sound receiver 22, the adder 24, and the sound outputter 26 may be mounted on a single device.

The sound signal $S_G$ generated by the sound receiver 22 is supplied to the distribution terminal 20 after branching off from a path between the sound receiver 22 and the adder 24. Alternatively, the sound signal $S_G$ may be supplied by radio to the distribution terminal 20.

The distribution terminal 20 is a device configured to provide the terminal device 30 with distribution information D corresponding to the guidance voice V represented by the sound signal $S_G$ supplied from the sound receiver 22. The distribution terminal 20 is realized, for example, by a portable terminal device such as a mobile phone and a smartphone. As shown in FIG. 2, the distribution terminal 20 is configured to include a controller 210 and a communicator 220. The communicator 220 communicates with the management device 10 via the communication network 200. The communicator 220 according to the first embodiment is a radio communication device that communicates with the communication network 200 by radio.

The controller 210 is a control device (e.g., a Central Processing Unit (CPU)) that controls the overall operation of the distribution terminal 20. When the controller 210 executes a program stored in a publicly known recording medium (not shown) such as a semiconductor recording medium or a magnetic recording medium, a plurality of functions (a voice acquirer 212 and a signal processor 214) for acquiring and distributing distribution information D corresponding to the guidance voice V are realized.

The voice acquirer 212 acquires from the sound receiver 22 a sound signal $S_G$ representative of the guidance voice V and transmits the sound signal $S_G$ through the communicator 220 via the communication network 200 to the management device 10. The management device 10 receives the sound signal $S_G$ transmitted from the voice guidance system 100 and generates distribution information D that specifies a registered text that corresponds to the guidance voice V represented by the sound signal $S_G$. The distribution information D generated by the management device 10 is transmitted from the management device 10 to the voice guidance system 100. The communicator 220 receives from the communication network 200 the distribution information D transmitted from the management device 10.

The signal processor 214 generates an audio signal $S_D$ representative of a sound including the distribution information D received by the communicator 220 from the management device 10. The audio signal $S_D$ includes the distribution information D as an audio component within a prescribed frequency band. More specifically, the frequency band of the audio signal $S_D$ is one in which sound output by the sound outputter 26 and sound reception by the terminal device 30 is possible. Moreover, this frequency band is within the range of a frequency band (e.g., between 18 kHz and 20 kHz, inclusive) that is higher than the frequency band of a sound such as a voice (e.g., a guidance voice V) and music that may be present and audible to a user in an ordinary environment. A publicly known technique may be freely chosen when the signal processor 214 generates the audio signal $S_D$. For example, a configuration may be employed in which spread modulation of the distribution information D using a spread code and frequency conversion using a carrier of a prescribed frequency are sequentially carried out so as to generate the audio signal $S_D$. Alternatively, another configuration may be employed in which the audio signal $S_D$ is generated by frequency-modulating a carrier such as a sine wave of a prescribed frequency with the distribution information D.

The adder 24 of the voice guidance system 100 generates an audio signal $S_1$ by adding the audio signal $S_D$ generated by the signal processor 214 and the sound signal $S_G$ generated by the sound receiver 22. Accordingly, the audio component of the distribution information D is output as sound from the sound outputter 26 together with the guidance voice V uttered by the operator $O_P$. As will be understood from the above explanation, the sound outputter 26 according to the first embodiment functions as an element (information transmitter) that transmits to the terminal device 30 the distribution information D by sound communication that uses, as a transmission medium, sounds as in aerial vibration (i.e., sound waves). Thus, the sound outputter 26 for outputting the guidance voice V received by the sound receiver 22 is also used for the transmission of the distribution information D. For convenience, a D/A converter that converts the audio signal $S_1$ from a digital to an analog signal is not shown in the figure.

Management Device 10

The management device 10 is a device that manages the distribution information D that is provided to the terminal device 30. The management device includes, as shown in FIG. 2, a controller 110, a storage unit 120, and a communicator 130. The management device 10 may be realized as a single device or, alternatively, may be realized by a plurality of devices that are configured separately from one another. For example, a storage unit 120 (cloud storage) may be provided separately from the management device 10, with the controller 110 reading from and writing to the storage unit 120, for example, via the communication network 200. In other words, the storage unit 120 may be omitted from the management device 10.

The controller 110 is a control device, for example, a CPU that controls the overall operation of the management device 10. The communicator 130 communicates with the distribution terminal 20 via the communication network 200. For example, the communicator 130 receives the sound signal $S_G$ transmitted from the distribution device 20. There are stored in the storage unit 120 programs that the controller 110 executes together with various kinds of data used by the controller 110. For example, a publicly known recording medium, such as a semiconductor recording medium and a magnetic recording medium, or a combination of a plurality of such publicly known recording media may be freely used as the storage unit 120. The storage unit 120 according to the first embodiment stores a guidance table $T_A$.

FIG. 3 is a model of the guidance table $T_A$. As shown in FIG. 3, the guidance table $T_A$ is a data table in which a plurality of registered texts X ($X_1$, $X_2$ . . . ) are respectively associated with pieces of distribution information D ($D_1$, $D_2$ . . . ). The registered texts X ($X_1$, $X_2$ . . . ) each represent the uttered content of a corresponding one of mutually different guidance voices V. That is, the plurality of registered texts X (texts that may be uttered by the operator $O_P$) included in the announcement booklet, which is referred to by the operator $O_P$ at the time of uttering the guidance voice V, is registered in the guidance table $T_A$. Each piece of distribution information D is identification information that is uniquely assigned to a corresponding registered text X.

A voice analyzer 112 shown in FIG. 2 analyzes a text (hereinafter, uttered text) L that is representative of the content of an utterance of the guidance voice V by use of speech recognition performed on the sound signal $S_G$ received by the communicator 130 from the distribution terminal 20. Any publicly known technique may be freely used for performing speech recognition on the sound signal $S_G$, an example being a recognition technique that uses an audio model such as the Hidden Markov Model (HMM), and a language model that indicates language constraints. As in the foregoing, since the operator $O_P$ utters a registered text X that has been prepared in advance, ideally, the uttered text L identified by the voice analyzer 112 based on the sound signal $S_G$ should match one of the registered texts X registered in the guidance table $T_A$. In reality, however, a recognition error may occur in the analysis carried out by the voice analyzer 112 as a result of, for example, speech characteristics (habits) that are unique to the individual operator $O_P$ or due to background noise in the carriage C. Consequently, there may be cases in which the uttered text L and the registered text X resemble each other but may not strictly correspond to each other. For example, even if the operator $O_P$ utters a registered text X, "ka-ke-ko-mi joh-sha-ni go-chu-i ku-da-sa-i" (a Japanese sentence meaning "Please do not rush into a train"), the uttered text L that the voice analyzer 112 actually identifies may be something equivalent to "ka-ki-ko-mi joh-sha-ni go-chu-i ku-ra-ha-i". (In this example, the "ka-ke-ko-mi" in the registered text X becomes "ka-ki-ko-mi" in the uttered text L, and the "ku-da-sa-i" in the registered text X becomes "ku-ra-ha-i".) Alternatively, another configuration may be adopted in which there is no voice analyzer 112 provided by the controller 110 and, for example, a different voice analyzing device that is connected to the management device 10 via the communication network 200 instead performs speech recognition on the sound signal $S_G$.

For each of the different guidance voices V, a text identifier 114 identifies, among a plurality of registered texts X registered in the guidance table $T_A$, a registered text X that is similar to the uttered text L analyzed by the voice analyzer 112. More specifically, the text identifier 114 calculates an index (hereinafter, a similarity index) of how similar each of the plurality of registered texts X in the guidance table $T_A$ is to the uttered text L and identifies from among the plurality of registered texts X, one registered text X a similarity of which as indicated by the similarity index is the largest (i.e., the registered text X that is the most similar to the uttered text L). The type of similarity index may be chosen freely, and any publicly known index, such as an edit distance (Levenshtein distance) for evaluating a similarity between texts, may be used. Identification of a registered text X carried out by the text identifier 114 may be also interpreted as a process for correcting an uttered text L that is analyzed by the voice analyzer 112 to bring it into line with the registered text X, which text is similar to the uttered text L. The text identifier 114 acquires from the guidance table $T_A$ distribution information D corresponding to the registered text X identified in the above manner, and transmits from the communicator 130 the distribution information D to the distribution terminal 20 of the voice guidance system 100.

As will be understood from the above explanation, the distribution information D of the registered text X is transmitted from the management device 10 to the distribution terminal 20, the registered text X corresponding to the uttered text L, and the registered text X being free from recognition errors made by the voice analyzer 112 (the influence of speech characteristics unique to the operator $O_P$) and free also from the influence of background noise that occurred upon receipt of sound. As described above, in the voice guidance system 100, the audio component of the distribution information D received from the management device 10 by the communicator 220 and the guidance sound V are output from the sound outputter 26. Only after the operator $O_P$ finishes uttering the guidance voice V and the analysis by the voice analyzer 112 of the uttered text L has been completed is the identification of the registered text X, as well as the transmission of the distribution information D to the distribution terminal 20 carried out. Therefore, the audio component of the distribution information D is output from the sound outputter 26, with a delay being present from the output of the guidance voice V.

Terminal Device 30

FIG. 4 is a block diagram of the terminal device 30. As shown in FIG. 4, the terminal device 30 is configured to include a sound receiver 310, a controller 320, a storage unit 330, and a presenter 340. The controller 320 is a control device (e.g., a CPU) that controls the overall operation of the terminal device 30. There are stored in the storage unit 330 a program (guidance program) that the controller 320 executes and various data that the controller 320 uses. In the first embodiment, a guidance table $T_B$ is stored in the storage unit 330 as shown in FIG. 4.

The guidance table $T_B$ is a data table in which a plurality of pieces of guidance information G ($G_1$, $G_2$ . . . ) each corresponding to a respective one of guidance voices V that are different from each other are associated with pieces of distribution information D ($D_1$, $D_2$ . . . ), respectively. According to the first embodiment, a piece of guidance information G corresponding to a piece of guidance voice V is a registered text X that is representative of the content of an utterance of the guidance voice V, and it is with this registered text X, that a piece of distribution information D is associated. In other words, the guidance table $T_B$ according to the first embodiment contains the same content as the guidance table $T_A$ stored in the storage unit 120 of the management device 10. Any publicly known recording medium, such as a semiconductor recording medium or a magnetic recording medium, or a combination of a plurality of kinds of such recording media may constitute the storage unit 330. A plurality of functions (an information extractor 322 and an information manager 324) for presenting to the user U the guidance information G registered in the guidance table $T_B$ are realized by the controller 320 executing programs stored in the storage unit 330.

The sound receiver 310 is an audio device (microphone) that receives surrounding sounds, and the sound receiver 310 generates an audio signal $S_2$ by receiving the sound output from the sound outputter 26 of the distribution terminal 20. The audio signal $S_2$ includes an audio component (audio signal $S_D$) indicative of the distribution information D. For convenience, the A/D converter for converting the audio signal $S_2$ generated by the sound receiver 310 is not shown.

The information extractor 322 extracts the distribution information D by demodulating the audio signal $S_2$ generated by the sound receiver 310. More specifically, the information extractor 322 extracts the distribution information D by emphasizing a component of the frequency band including the distribution information D within the audio signal $S_2$ by use of, for example, a band pass filter, and then letting the band component pass a matched filter in which there is used, as a coefficient, the spread code used in the spread modulation of the distribution information D. The information manager 324 selects, from among the plurality of guidance information G in the guidance table $T_B$, guidance information G (registered text X) that corresponds to the distribution D extracted by the information extractor 322.

The presenter 340 presents to the user U of the terminal device 30 the guidance information G selected by the information manager 324. The presenter 340 according to the first embodiment is a display device (e.g., a liquid crystal display panel) that displays the registered text X indicated by the guidance information G. As will be understood from the above explanation, the registered text X corresponding to the content of an utterance (uttered text L) of the guidance voice V uttered by the operator $O_p$ is presented to the user U on the presenter 340 as the guidance information G. For example, even if an incorrect uttered text L, "ka-ki-ko-mi joh-sha-ni go-chu-i ku-ra-ha-i", is identified by speech recognition performed on the sound signal $S_G$ that represents the guidance voice V, a registered text X, "ka-ke-ko-mi joh-sha-ni go-chu-i ku-da-sa-i", is displayed as the guidance information G on the presenter 340 of the terminal device 30, as shown in FIG. 5. By viewing the guidance information G presented on the presenter 340, the user U is able to visually recognize the guidance information G related to the guidance voice V uttered by the operator $O_p$ and then output from the sound outputter 26.

Figure 6:
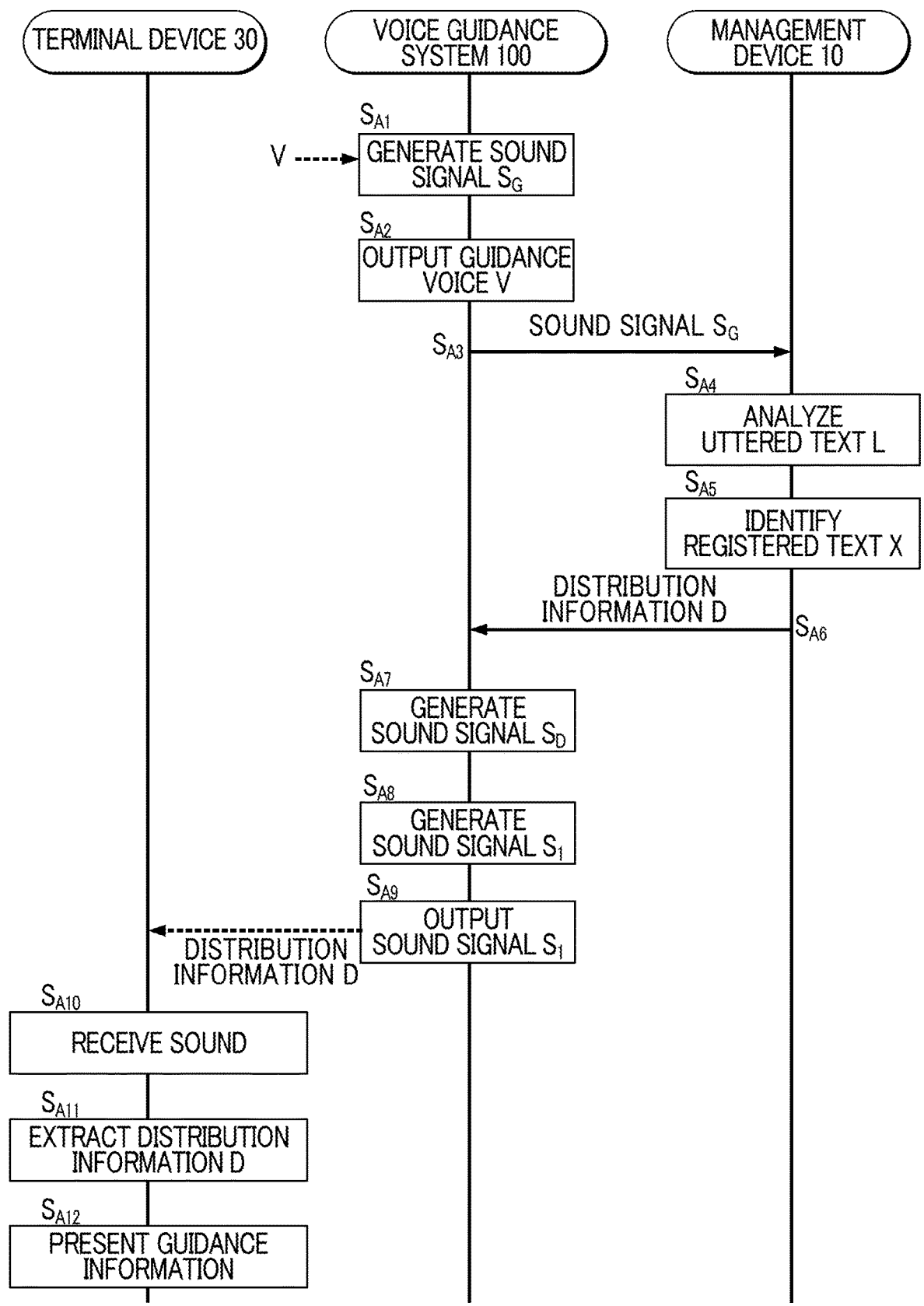
FIG. 6 is a diagram explaining an operation of the information providing system.

FIG. 6 illustrates an overall operation of the information providing system 1. When the operator $O_p$ utters a guidance voice V that corresponds to a registered text X, the sound receiver 22 of the voice guidance system 100 receives the guidance voice V and generates a sound signal $S_G$ ($S_{A1}$). The sound signal $S_G$ generated by the sound receiver 22 is output from the sound receiver 22 to the sound outputter 26 ($S_{A2}$), for output as a sound, while the same sound signal $S_G$ is acquired by the voice acquirer 212 and transmitted from the communicator 220 to the communication network 220 ($S_{A3}$).

When the communicator 130 receives from the communication network 200 the sound signal $S_G$ transmitted from the distribution terminal 20, the voice analyzer 112 of the management device 10 performs speech recognition on the sound signal $S_G$ of the guidance voice V and analyzes the uttered text L representative of the content of an utterance of the guidance voice V ($S_{A4}$). The text identifier 114 identifies, from among a plurality of registered texts X in the guidance table $T_A$, a registered text X that is similar to the uttered text L analyzed by the voice analyzer 112 ($S_{A5}$). In other words, the uttered text L is corrected to the registered text X, the registered text X being free from any recognition error made by the voice analyzer 112. The communicator 130 transmits to the distribution terminal 20 distribution information D that corresponds to the registered text X selected by the text identifier 114 ($S_{A6}$).

When the communicator 220 receives the distribution information D transmitted from the management device 10, the signal processor 214 of the distribution terminal 20 generates an audio signal $S_D$ that includes as an audio component the distribution information D ($S_{A7}$). The adder 24 of the distribution terminal 20 generates an audio signal $S_1$ by adding the sound signal $S_G$ generated by the sound receiver 22, and the audio signal $S_D$ generated by the signal processor 214 ($S_{A8}$). The sound outputter 26 outputs a sound corresponding to the audio signal $S_1$ ($S_{A9}$). That is, the guidance voice V received by the sound receiver 22 and the audio component of the distribution information D are output from the sound outputter 26.

The sound receiver 310 of the terminal device 30 receives the sound output from the sound outputter 26 and generates an audio signal $S_2$ ($S_{A10}$). The information extractor 322 extracts the distribution information D by demodulating the audio signal $S_2$ generated by the sound receiver 310 ($S_{A11}$). The information manager 324 selects the guidance information G corresponding to the distribution information D extracted by the information extractor 322 from the guidance table $T_B$. The presenter 340 presents to the user U the registered text X indicated by the guidance information G selected by the information manager 324 ($S_{A12}$).

As described above, according to the first embodiment, the distribution information D of a registered text X is transmitted to the terminal device 30, the registered text X being, from among a plurality of registered texts X being representative of the uttered content of the mutually different guidance voices V, a registered text X that is similar to the uttered text L identified by the voice analyzer 112 that performs speech recognition on the sound signal $S_G$ of the guidance sound V. Accordingly, it is possible to provide the user U via the terminal device 30 with more appropriate guidance information G, the guidance information G being free from the influence of any speech recognition error, as compared to a configuration in which the uttered text L analyzed by the voice analyzer 112 is provided to the terminal device 30.

According to the above configuration, the sound outputter 26 of the voice guidance system 100 outputs the guidance voice V received by the sound receiver 22 and the audio components of the distribution information D. Thus, the sound outputter 26 that is used to output the sound of the guidance voice V is also used to output the sound including the distribution information D, and the distribution information D is transmitted to the terminal device 30 by communicating sound with aerial vibration acting as a transmission medium. As a result, it is possible to simplify the configuration of the information providing system 1, compared to a configuration in which the distribution information D is transmitted to the terminal device 30 independently from the output of the guidance voice V.

Meanwhile, the transmission quantity of sound communication tends to be less than that of radio communication that uses magnetic waves or electric waves as the transmission medium. As a result, for example, it would be difficult to transmit the registered text X identified by the text identifier 114 from the sound outputter 26 to the terminal device 30 by sound communication. However, according to the first embodiment the identification information of the registered text X identified by the text identifier 114 is transmitted from the sound outputter 26 to the terminal device 30 as the distribution information D, and thus, it is possible to transmit this distribution information D to the terminal device 30 using sound communication, despite the limitation on the transmission quantity.

Second Embodiment

A second embodiment of the present invention will now be described below. In the embodiments described below, for elements that have the same actions and functions as those of the first embodiment, the same reference signs as those used in the description of the first embodiment will be used and detailed explanations thereof will be omitted.

Figure 7:
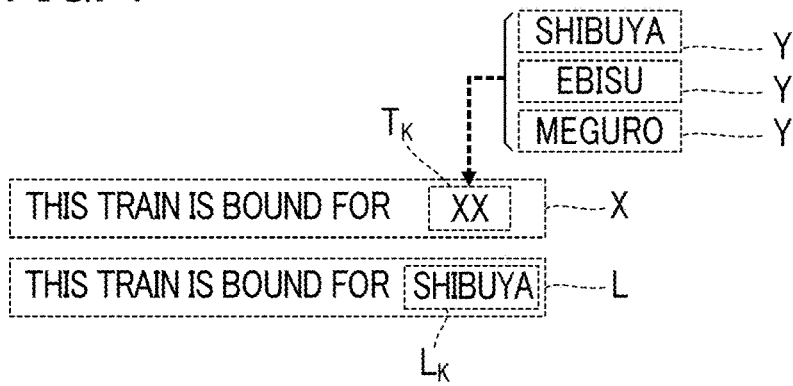
FIG. 7 is a diagram explaining registered texts and phrases to be inserted according to a second embodiment.

The registered texts X to be uttered by the operator $O_P$ could be a text consisting of (hereinafter, specific registered text) a fixed portion (hereinafter, fixed phrase) that is used in common for a plurality of guidance voices V and a variable part (hereinafter, phrase to be inserted) that is inserted into a particular part of the fixed phrase. For example, as shown in FIG. 7, it is supposed that there is a specific registered text X, "This train is bound for XX.", which is used to announce the destination of the carriage C to the user U. Within the specific registered text X, an insertion section $T_K$ (the section shown in FIG. 7, indicated as XX) is set, and any one of a plurality of different phrases to be inserted Y is selectively inserted into the insertion section $T_K$. The phrase to be inserted Y may include a proper noun, such as a name of a station or a route, or a noun that specifies a platform number at which to embark or disembark. In FIG. 7, station names, such as "Shibuya", "Ebisu", or "Meguro", are shown as examples of words to be inserted Y.

Figure 8:
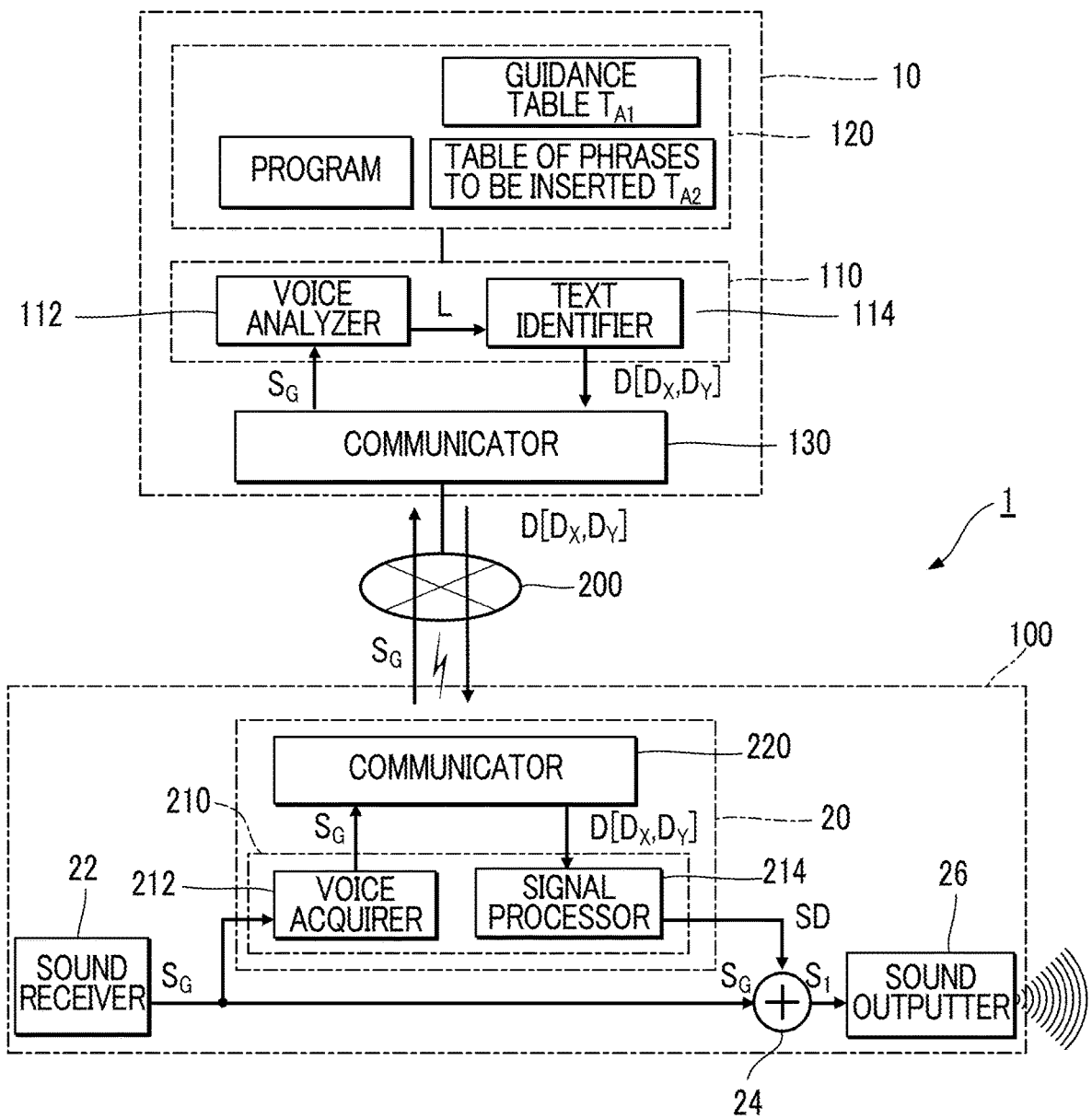
FIG. 8 is a block diagram of an information providing system according to the second embodiment.

FIG. 8 is a block diagram of the voice guidance system 100 and the management device 10 according to the second embodiment. As shown in FIG. 8, the storage unit 120 of the management device 10 stores the guidance table $T_{A1}$ and a table of phrases to be inserted $T_{A2}$.

FIG. 9 is a model of the guidance table $T_{A1}$ in accordance with the second embodiment. The guidance table $T_{A1}$ in accordance with the second embodiment is a data table in which a plurality of registered texts X ($X_1$, $X_2$, ...) are respectively associated with a corresponding piece of identification information $D_X$ ($D_{X1}$, $D_{X2}$, ...) in the same manner as in the first embodiment. In the guidance table $T_{A1}$ in accordance with the second embodiment, however, in addition to registered texts X not including insertion sections $T_K$, specific registered texts X including insertion sections $T_K$ may be registered. At an insertion section $T_K$ within a specific registered text X, there is attached a predetermined symbol to indicate an insertion section $T_K$. A piece of identification information $D_X$ is identification information uniquely assigned to each registered text X.

FIG. 10 is a diagram of a table of phrases to be inserted $T_{A2}$ according to the second embodiment. The table of phrases to be inserted $T_{A2}$ is in the form of a data table in which a plurality of phrases to be inserted Y ($Y_1$, $Y_2$, ...) are each associated with a corresponding piece of identification information $D_Y$ ($D_{Y1}$, $D_{Y2}$, ...). More specifically, a plurality of phrases to be inserted Y that may be inserted into an insertion section $T_K$ of a specific registered text X are registered in the table of phrases to be inserted $T_{A2}$. A piece of identification information $D_Y$ is identification information uniquely assigned to each phrase to be inserted Y.

Figure 11:
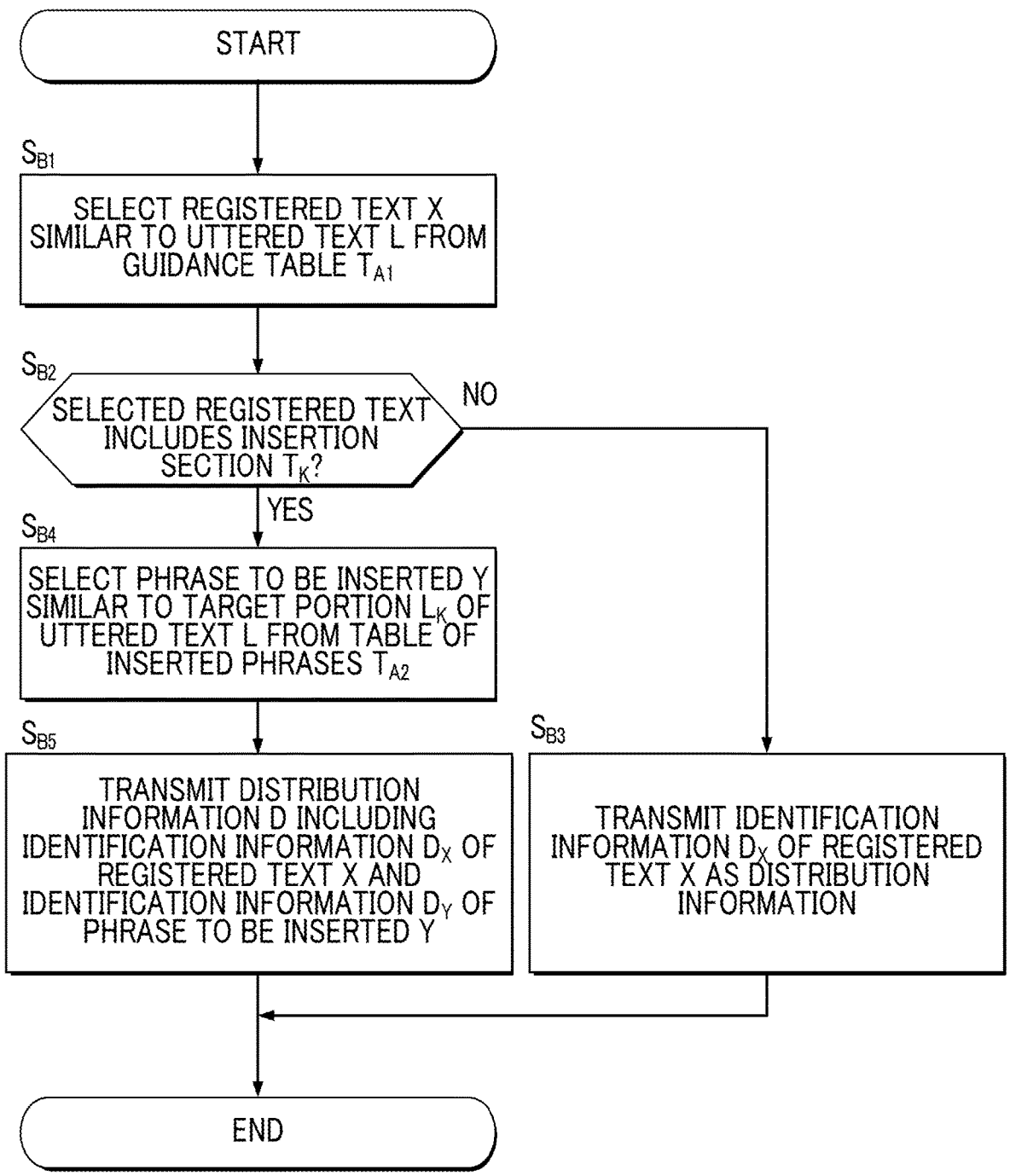
FIG. 11 is a flowchart showing the flow of an operation of a text identifier according to the second embodiment.

The text identifier 114 of FIG. 8 identifies a registered text X that is similar to the uttered text L, from among the plurality of registered texts X registered in the guidance table $T_{A1}$, and that has been analyzed by the voice analyzer 112 in the same manner as in the first embodiment. Furthermore, the text identifier 114 in accordance with the second embodiment identifies, from among a plurality of phrases to be inserted Y that are registered in the table of phrases to be inserted $T_{A2}$, a phrase to be inserted Y that is similar to a target portion $L_K$ of the uttered text L, when the registered text X is a specific registered text X including an insertion section $T_K$. As shown in FIG. 7, the target portion $L_K$ of the uttered text L is a portion equivalent to the phrase to be inserted corresponding to the insertion section $T_K$ of the specific registered text X among the uttered text L. FIG. 11 is a diagram illustrating operation of the text identifier 114 in accordance with the second embodiment. The processing shown in FIG. 11 is initiated when the voice analyzer 112 identifies the uttered text L.

The text identifier 114 selects a registered text X similar to the uttered text L from among the plurality of registered texts X in the guidance table $T_{A1}$ ($S_{B1}$). It is of note that the insertion section $T_K$ of the specific registered text X and the target portion $L_K$ of the uttered text L do not match. However, since the fixed phrase other than the insertion section $T_K$ within the uttered text L is either similar to or the same as the fixed phrase other than the insertion section $T_K$ within the registered text X, there is a high possibility that the similarity index of the specific registered text X will correspond to the guidance voice V uttered by the operator $O_P$ and maximized even when a configuration in which a similarity index similar to that in accordance with the first embodiment is used. Consequently, it is possible for the text identifier 114 to identify the specific registered text X. A preferable, alternative configuration, however, is one in which the similarity index between the specific registered text X and the uttered text L is calculated after the weight (the degree to which the similarity index reflects) is reduced regarding the insertion section $T_K$ of the specific registered text X and the target portion $L_K$ of the uttered text L, from a standpoint of reducing an influence of a difference between the insertion section $T_K$ of the specific registered text X and the target portion $L_K$ of the uttered text L. That is, whether the fixed phrases within the specific registered text X and the uttered text L are similar to each other is predominantly reflected in the similarity index, and the influence is reduced of whether the insertion section $T_K$ of the specific registered text X and the target portion $L_K$ of the uttered text L are similar to each other. Accordingly, it is possible to appropriately identify the specific registered text X when the operator $O_P$ utters a guidance voice V that is a combination of the specific registered text X and any phrase to be inserted Y.

The text identifier 114 judges whether the registered text X identified from the guidance table $T_{A1}$ is a specific registered text X (i.e., whether there is an insertion section $T_K$) ($S_{B2}$). When the registered text X does not include an insertion section $T_K$ ($S_{B2}$: NO), the text identifier 114 transmits from the communicator 130 to the voice guidance system 100 the identification information $D_X$ of the registered text X as the distribution information D in the same manner as in the first embodiment ($S_{B3}$). The distribution information D is transmitted from the sound outputter 26 of the voice guidance system 100 to the terminal device 30 using sound communication in the same manner as in the first embodiment.

When the registered text X identified from the guidance table $T_{A1}$ is a specific registered text X ($S_{B2}$: YES), a phrase to be inserted Y similar to the target portion $L_K$ of the uttered text L is identified from the table of phrases to be inserted $T_{A2}$ by the text identifier 114 ($S_{B4}$). More specifically, the text identifier 114 extracts, from within the uttered text L, the target portion $L_K$ corresponding to the insertion section $T_K$ of the specific registered text X. Then the text identifier 114 calculates for each of the plurality of phrases to be inserted Y registered in the table of phrases to be inserted $T_{A2}$ a similarity index indicating the similarity with the target portion $L_K$. The method of calculating the similarity index is the same as in the first embodiment. Then, the text identifier 114 identifies a single phrase to be inserted Y with a degree of similarity that the similarity index indicates is the largest (i.e., the phrase to be inserted Y that is the most similar to the target portion $L_K$ within the uttered text L).

The text identifier 114 transmits from the communicator 130 to the voice guidance system 100 the distribution information D that includes the identification information $D_X$ of the specific registered text X identified in step $S_{B1}$ and the identification $D_Y$ of the phrase to be inserted Y identified at step $S_{B4}$ ($S_{B5}$). The distribution information D is transmitted from the sound outputter 26 of the voice guidance system 100 to the terminal device 30 using sound communication. As will be understood from the above explanation, the sound outputter 26 according to the second embodiment transmits to the terminal device 30, the distribution information D that indicates the specific registered text X similar to the uttered text L and the phrase to be inserted Y.

Figure 12:
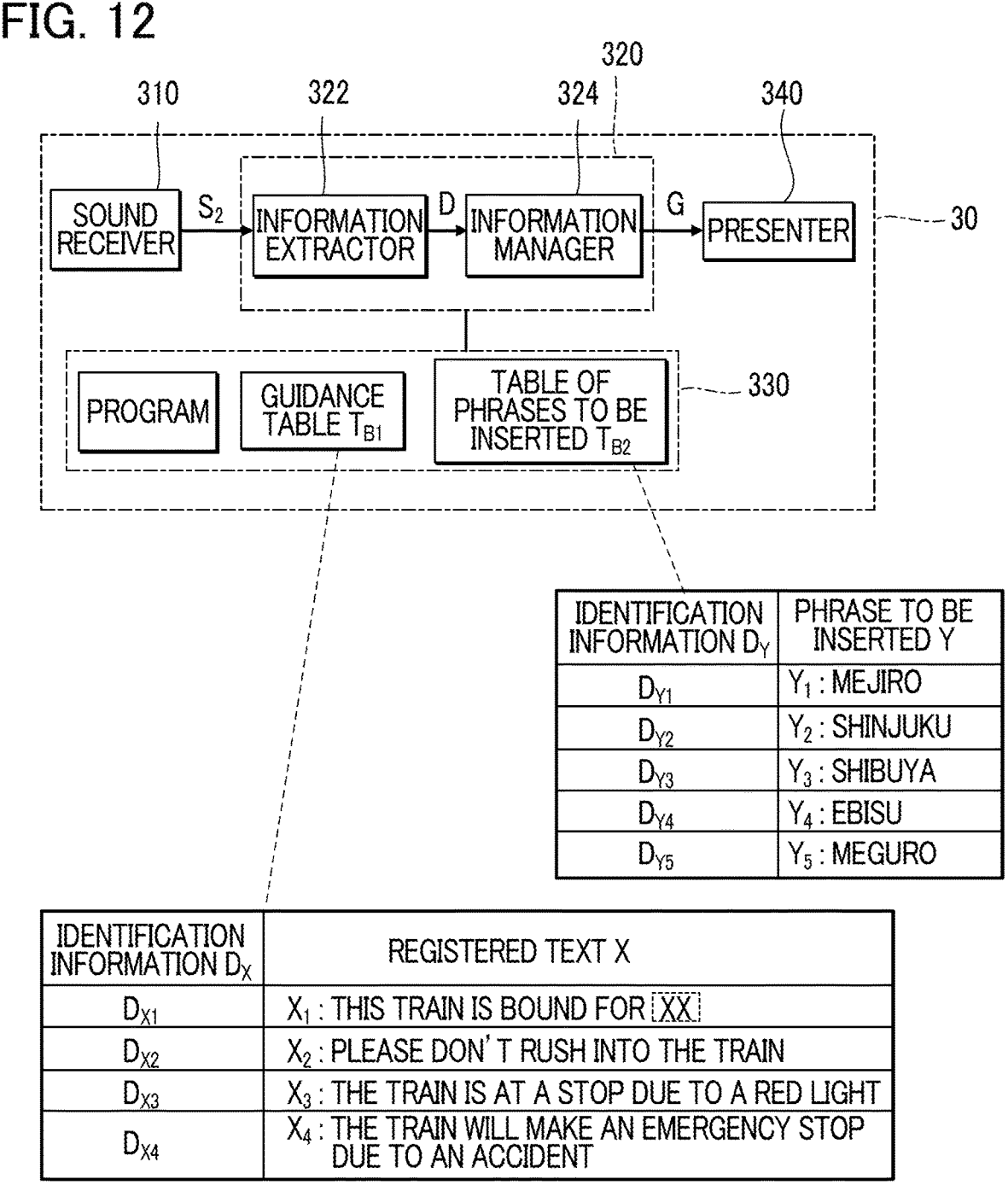
FIG. 12 is a block diagram of a terminal device according to the second embodiment.

FIG. 12 is a block diagram of the terminal device 30 in accordance with the second embodiment. As shown in FIG. 12, a guidance table $T_{B1}$ and a table of phrases to be inserted $T_{B2}$ are in the storage unit 330 of the terminal device 30 according to the second embodiment. The guidance table $T_{B1}$ is a data table in which a plurality of registered texts X are each associated with a corresponding identification information $D_X$ in the same manner as the guidance table $T_{A1}$ in the management device 10. Similar to the table of phrases to be inserted $T_{B2}$ of the management device 10, the table of phrases to be inserted $T_{B2}$ is a data table in which a plurality of phrases to be inserted Y that may be inserted into a specific registered text X are each associated with a corresponding piece of identification information $D_Y$.

The information manager 324 generates guidance information G that corresponds to the distribution information D extracted by the information extractor 322 from the sound output by the voice guidance system 100. More specifically, in a case where the distribution information D includes the identification information $D_X$ of the specific registered text and the identification information $D_Y$ of the phrase to be inserted Y, the information manager 324 indicates to the presenter 340 a text obtained by combining the specific registered text X and the phrase to be inserted Y as the guidance information G. Even more specifically, the information manager 324 selects the specific registered text X corresponding to the identification information $D_X$ from the guidance table $T_{B1}$, and selects the phrase to be inserted Y corresponding to the identification information $D_Y$ from the table of phrases to be inserted $T_{B2}$ to generate guidance information G obtained by inserting the phrase to be inserted Y to the insertion section $T_K$ of the specific registered text X. In other words, the information manager 324 is a guidance information generator that generates guidance information G with a phrase to be inserted Y inserted into the insertion section $T_K$, the phrase to be inserted Y being, among a plurality of phrases to be inserted Y stored in the storage unit 300, one that is indicated by the distribution information D (identification information $D_Y$), and the insertion section $T_K$ being within a registered text X that is indicated by the distribution information D (identification information $D_X$) that has been extracted by the information extractor 322 from among a plurality of registered texts X stored in the storage unit 330. On the other hand, in a case where the distribution information D does not include the identification information $D_Y$ of the phrase to be inserted Y (i.e., when the text identifier 114 has identified a registered text X that does not include an insertion section $T_K$), the information manager 324 selects, as the guidance information G, from the guidance table $T_{B1}$ a registered text X indicated by the distribution information D (identification information $D_X$) and indicates it to the presenter 340.

The same effects as those realized by the first embodiment are also realized by the second embodiment. Furthermore, according to the second embodiment, a phrase to be inserted Y that is similar to the target portion $L_K$ of an uttered text L is identified from among a plurality of phrases to be inserted Y that may be inserted into the insertion section $T_K$ of a specific registered text X, and distribution information D indicating the specific registered text X and the phrase to be inserted Y is transmitted to the terminal device 30. Accordingly, in a situation where a plurality of guidance voices V in which different phrases to be inserted are inserted into fixed sentences are uttered, it is possible to present to the user of a terminal device 30 an appropriate one of pieces of guidance information G corresponding to respective guidance voices V whose phrases to be inserted Y are different from one another, without the need to prepare a registered text X separately for each guidance voice V.

The terminal device 30 according to the second embodiment generates guidance information G with the a phrase to be inserted Y indicated by distribution information D inserted into a registered text X indicated by the distribution information D, from among a plurality of registered texts X and a plurality of phrases to be inserted Y that are stored in the storage unit 330, and thus, there is no need for the terminal device 30 to carry out communication via the communication network 200 in order to acquire the guidance information G.

Third Embodiment

According to the second embodiment, a phrase to be inserted Y that is similar to the target portion $L_K$ within an uttered text L is selected from among a plurality of phrases to be inserted Y registered in the table of phrases to be inserted $T_{B2}$. According to the third embodiment, a phrase to be inserted Y is inserted on the basis of the status of the carriage C (e.g., rail/bus status), on which the guidance is to be provided, in addition to the similarity between the target portion $L_K$ of the uttered text L and the phrase to be inserted Y.

Figure 13:
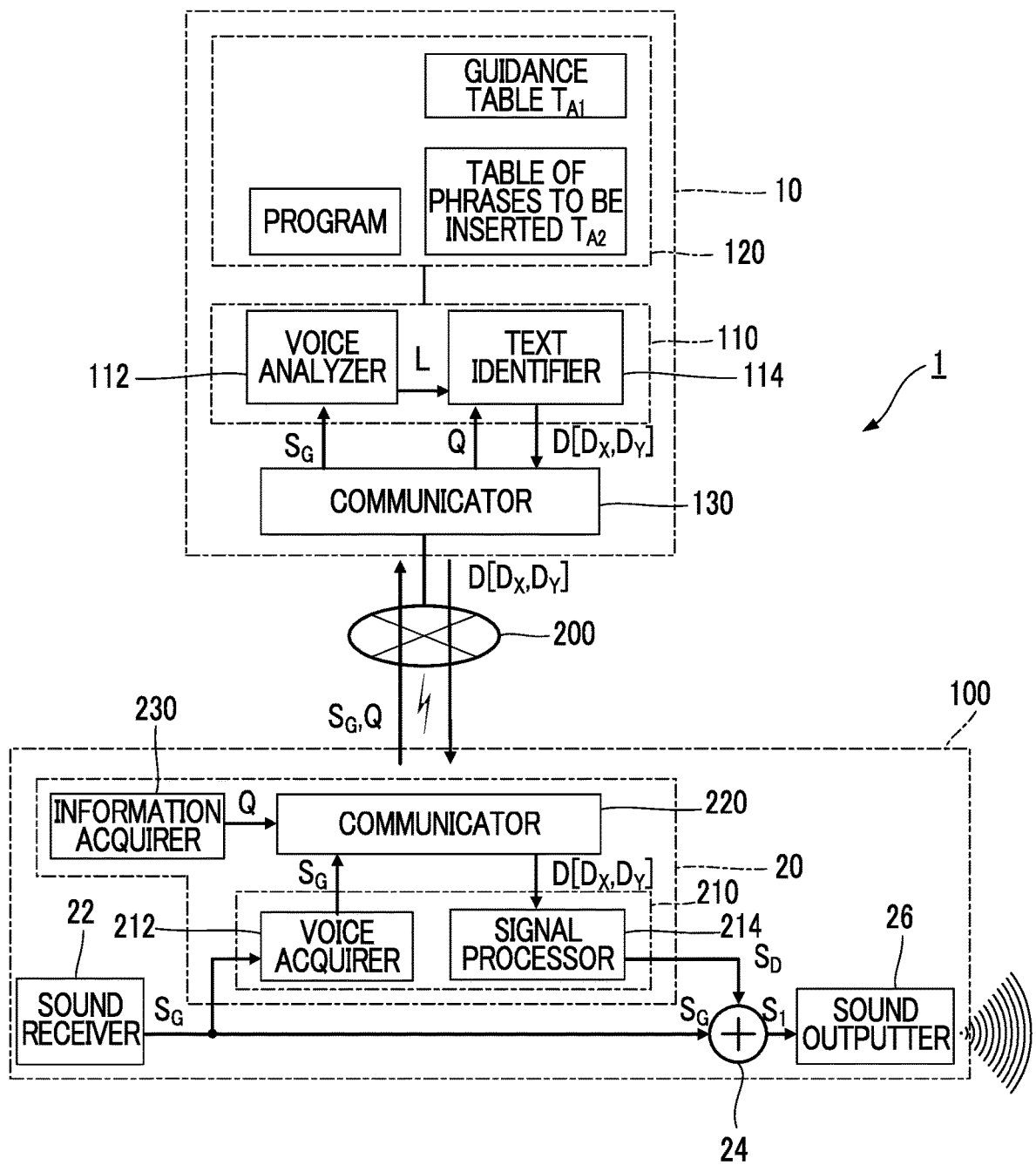
FIG. 13 is a block diagram of an information providing system according to a third embodiment.

FIG. 13 is a block diagram of the voice guidance system 100 and the management device 10 in accordance with the third embodiment. As shown in FIG. 13, the distribution terminal 20 of the voice guidance system 100 in accordance with the third embodiment includes an information acquirer 230 in addition to the same elements as those included in the first embodiment (i.e., the controller 210 and the communicator 220). The information acquirer 230 generates status information Q that indicates the status of the carriage C. The information acquirer 230 is configured, for example, to include a positioning device, such as a Global Positioning System (GPS), that positions the carriage C, and generates location information indicating a location of the carriage C as the status information Q. The status information Q acquired by the information acquirer 230 is transmitted from the communicator 220 to the management device 10.

The text identifier 114 in accordance with the third embodiment selects a phrase to be inserted Y for a specific registered text X, in the same manner as in the second embodiment. It is of note, however, that with respect to the selection of a phrase to be inserted Y in accordance with the third embodiment, the status information Q that has been received from the communicator 130 by the distribution terminal 20 is taken into consideration, in addition to the similarity between the uttered text L and the phrase to be inserted Y. More specifically, the text identifier 114 first identifies two or more phrases to be inserted (hereinafter, candidate phrases to be inserted) Y that are similar to the target portion $L_K$ of the uttered text L, from among a plurality of phrases to be inserted Y registered in the table of phrases to be inserted $T_{B2}$. For example, as the candidate phrases to be inserted Y, two or more phrases to be inserted Y that come high in order when the plurality of phrases to be inserted Y is listed in descending order according to a similarity index showing how similar they are to the target portion $L_K$. Alternatively, two or more phrases to be inserted Y whose similarity indexes exceed a certain threshold, may be selected. Then, the text identifier 114 selects from among a plurality of candidate phrases to be inserted Y a single phrase that corresponds to the status information Q. More specifically, the text identifier 114 selects the candidate phrase to be inserted Y that indicates the name of the station closest to the location of the carriage C, which is indicated by the status information Q, from among a plurality of candidate phrases to be inserted Y. That is, from among the plurality of candidate phrases to be inserted Y, the phrase to be inserted Y is selected that is considered to have the highest possibility of the operator $O_P$ uttering it under the present status of the carriage C. This process could be expressed as a filtering down of a plurality of candidate phrases to be inserted Y using the status information Q. In the above explanation, the determination of the phrase to be inserted Y is carried out after the selection of the candidate phrases to be inserted Y has been carried out according to their similarity indexes showing how similar they are to the uttered text L, using the status information Q. Alternatively, the candidate phrases to be inserted Y may be filtered down using the status information Q, and then the phrase to be inserted Y may be selected according to its similarity index showing how similar it is to the uttered text L.

The same effects that are realized by the first embodiment are also realized by the third embodiment. Furthermore, in accordance with the third embodiment, the correct guidance information G that takes into consideration the actual status of the guidance target (i.e., the rail/bus status) may be presented to the user U of the terminal device 30 since the phrase to be inserted Y is selected according to the status information Q that indicates the status of the object of the guidance voice V (i.e., the carriage C).

Meanwhile, the content of the status information Q is not limited to the location of the carriage C. For example, the text identifier 114 may acquire as the status information Q the name of the station that immediately precedes the carriage C and the route that the station is on. The text identifier 114, selects from among a plurality of candidate phrases to be inserted Y, candidate phrases that indicate the names of the stations that are immediately in front of or after the station that the carriage C has just stopped at, and are indicated by the status information Q, on the route indicated by the status information Q (i.e., the names of the stations that are shown as having a high possibility of being uttered by the operator $O_P$, from a judgment based on the station at which the carriage C has just stopped). Where a registered text X for which a phrase to be inserted Y that indicates time (for example, "It is hh:mm now." or "The train will be arriving at hh pm.") is inserted to the insertion section $T_K$, status information Q that indicates the current time or the operation schedule of the carriage C may be preferably used.

The system from which the text identifier 114 acquires status information Q is not limited to the voice guidance system 100. For example, a configuration may be adopted in which the text identifier 114 acquires status information Q from an operation management system that manages the operation of a plurality of carriages C in a unified manner. Another possible configuration is one in which the management device 10 manages the operation of each carriage C.

Modifications

The above-mentioned embodiments may be modified in various ways. Specific modifications are exemplified in the following. Any two or more of the below-presented examples may be combined as long as they do not contradict one another.

(1) In the embodiments described in the foregoing, a registered text X is presented as guidance information G to the user U of the terminal device 30. However, the content of the guidance information G is not limited to these examples. For example, the registered text X translated to another language may be presented to the user U of the terminal device 30 as guidance information G. More specifically, translations of registered texts X are stored in the guidance table $T_B$ in FIG. 4 as different guidance information G (G1, G2, . . . ). According to this configuration, since the translation of a guidance voice V is presented to the user U after the guidance voice V is played, it is helpful especially for foreigners who do not understand the language in which the guidance information V is spoken. Alternatively, information that relates to the guidance provided by a registered text X (e.g., tourist information of the surrounding area of an expected stop) may be presented to the user U as guidance information G.

In the previously presented embodiments, the presenter 340 displayed the guidance information G. However, the means by which the guidance information G is presented to the user U is not limited to this example (display). For example, speakers or headphones that output the sound of the guidance information G may be used as the presenter 340. In this case, the information manager 324 may acquire the sound of the guidance information G by voice-synthesizing the guidance information G stored in the storage unit 330 as a text. Alternatively, voice information itself that indicates the sound of the guidance information G may be stored in the storage unit 330 in advance.

(2) There may be a case in which an uttered text L of a guidance voice V is not similar to any of the registered texts X in the guidance table $T_A$. In such a case in which the uttered text L is not similar to any of the texts X, uttered text L (or a translation of the uttered text L) that has been analyzed by the voice analyzer 112 may be transmitted from the management device 10 via the communication network 200 to the terminal device 30. In this example in which the uttered text L is not similar to any of a plurality of registered texts X, the transmission of distribution information D to the terminal device 30 may be omitted.

(3) In the first embodiment, the identification information of a registered text X is transmitted to the terminal device 30 as distribution information D. In the second and third embodiments, the identification information $D_X$ of a registered text X and the identification information $D_Y$ of a phrase to be inserted Y are transmitted to the terminal device 30 as distribution information D. However, the content of the distribution information D is not limited to these examples. For example, a registered text X itself (or a text that is obtained by inserting a phrase to be inserted Y in a specific registered text X) may be transmitted to the terminal device 30 as the distribution information D.

(4) In the above-mentioned embodiments, the text identifier 114 identifies a single registered text X that is similar to an uttered text L. However, a case can be assumed in which a plurality of registered texts X are similar to an uttered text L (the similarity indexes thereof are close to each other). Taking the above circumstance into consideration, any one of the plurality of registered texts X that are similar to the uttered text L may preferably be selected according to an instruction inputted by the operator $O_P$ into the voice guidance system 100 (e.g., the distribution terminal 20). In other words, the operator $O_P$ may select the single registered text X that he/she has uttered from among the plurality of registered texts X that are similar to the uttered text L. In this example, a focus is on registered texts X, but a configuration may be adopted in which the operator $O_P$ selects any one of a plurality of phrases to be inserted Y that are similar to a target portion $L_K$ within an uttered text L.

(5) In the third embodiment, an example configuration is given in which the text identifier 114 selects a single phrase to be inserted Y from among a plurality of candidate phrases to be inserted Y according to status information Q. This could be also applied to registered texts X, and a configuration may be adopted in which a single registered text X is selected from among a plurality of registered texts X according to status information Q. For example, the text identifier 114 first identifies as candidates two or more registered texts X that are similar to an uttered text L from among a plurality of registered texts X registered in the guidance table $T_{B1}$. For example, two or more registered texts X that come high in order when the plurality of registered texts X is listed in descending order according to their similarity index showing how similar they are to the uttered text L may be selected as candidates. Another example would be one in which two or more registered texts X whose similarity indexes exceed a threshold are selected as candidates.

Then, the text identifier 114 selects a single registered text X from among the plurality of registered texts X according to status information Q. According to this configuration, a registered text X which is considered under the current status of the carriage C to be highly possible of being uttered by the operator $O_P$ is selected from among a plurality of registered texts X. In this way, for example, it is possible to appropriately exclude the registered texts X that cannot possibly be assumed from the status information Q. More specifically, for example, it is possible to exclude the registered text X, "Please do not rush into trains.", from the candidates when it is determined based on the status information Q that the carriage C is in motion.

(6) In the previously presented embodiments, the information providing system 1 is configured with the management device 10 and the voice guidance system 100 being provided separately from each other. However, the configuration of the voice guidance system 100 is not limited to this configuration. For example, a part or all of the functions of the management device 10 may be provided in the voice guidance system 100 (e.g., the distribution terminal 20). Namely, the computer system that is the executor of the information providing processes according to the different embodiments does not necessarily have to be the information providing system 1 including the management system 10 and the voice guidance system 100, but may instead be the voice guidance system 100 only.

(7) In the above-described embodiments, a plurality of pieces of guidance information G stored in the storage unit 330 of the terminal device 30 are selectively presented to the user U. However, the configuration for presenting the guidance information G that corresponds to the distribution information D to the user U is not limited to this example. For example, a distribution request including the distribution information D acquired from the voice guidance system 100 may be transmitted from the terminal device 30 to a distribution device that retains a plurality of pieces of guidance information G, and then the distribution device may transmit guidance information G that corresponds to the distribution information D identified by the distribution request, from among the plurality of pieces of guidance information G, to the terminal device 30 that has requested the guidance information G. This configuration is advantageous in that it is not necessary for the terminal device 30 to retain in the storage unit 330 a plurality of pieces of guidance information G. In contrast, according to a configuration in which guidance information G stored in the storage unit 330 of the terminal device 30 is presented to the user U, as in the above-described embodiments, an advantage is obtained in that it is not necessary to perform communication between the terminal device 30 and the distribution device via a communication network.

(8) In the embodiments described in the foregoing, a guidance table $T_B$ is stored in the storage unit 330 of the terminal device 30 in advance. However, another configuration may be adopted, in which the guidance table $T_B$ is acquired by the terminal device 30, at a predetermined timing, from the management device 10 of a separate distribution device that is connected to the communication network 200 (hereinafter, the management device 10, etc.). The predetermined timing may for example be a point of time in which it can be assumed that the user U has ridden in the carriage C. More specifically, situations can be assumed in which the GPS position information indicating the position of the carriage C and the GPS position information of the terminal device 30 of the user U match, or in which the terminal device 30 of the user U receives a short distance radio signal (a beacon signal, for example) that is transmitted to a communication device inside the carriage C. Furthermore, for example, a situation can be assumed in which the user U registers his/her position information in the management device 10, etc., by having the terminal device 30 read an information image (e.g., a QR code (registered trademark)) that is posted inside the carriage C. Other examples of the predetermined timing are: a timing at which the terminal device 30 downloads from the management device 10, etc., a guidance program according to this embodiment; or a timing at which the terminal device 30 receives a sound signal including the distribution information of the guidance table $T_B$. It is of note that it is possible to acquire a table of phrases to be inserted $T_{B2}$ from the management device 10, etc., in addition to the guidance table $T_B$.

When acquiring at least either of the guidance table $T_B$ or the table of the phrases to be inserted $T_{B2}$, a part of the information included in these tables may be acquired. For example, in a case where the guidance table $T_B$ includes information that corresponds to different languages, a part of the information that corresponds to a desired language (e.g., a part of the information that corresponds to a registered text X in German) may be acquired. Other configurations may include one in which at least either of the guidance table $T_B$ or the table of phrases to be inserted $T_{B2}$ is periodically updated to a new table, or one in which at least either of the guidance table $T_B$ or the table of phrases to be inserted $T_{B2}$ is updated to a new table in a case where a registered text corresponding to distribution information is found not to be stored in the guidance table $T_B$. Also, a configuration may be adopted in which, when a guidance program is started up (executed), a reference is made with the management device 10, etc., as to whether there is an updated guidance table $T_B$ or table of phrases to be inserted $T_{B2}$, and if an updated table exists, it is acquired.

(9) In the previously presented embodiments, the distribution information is transmitted to the terminal device 30 by sound communication that uses sounds as the transmission medium. However, the communication method by which the distribution information D is transmitted from the voice guidance system 100 to the terminal device 30 is not limited to sound communication. For example, distribution information D may be transmitted from the voice guidance system 100 to the terminal device 30 by radio communication that uses magnetic waves such as electric waves and infrared rays, etc. As will be understood from the foregoing, a preferable method by which to transmit the distribution information D is short distance radio communication that does not require the communication network 200. The sound communication that uses sounds as the transmission medium, and the radio communication that uses magnetic waves as the transmission medium are examples of such short distance radio communication.

(10) In the above-mentioned embodiments, the sound outputter 26 of the voice guidance system 100 transmits the distribution information D to the terminal device 30 by sound communication. However, the configuration by which the distribution information D is transmitted to the terminal device 30 is not limited thereto. For example, the communicator 130 of the management device 10 may transmit (e.g., push-transmit) the distribution information D to the terminal device 30 via the communication network 200.

As will be understood from the above, an "information transmitter" may be comprehensively expressed as an element that transmits distribution information D to the terminal device 30, the distribution information D indicating a registered text X, or a specific registered text X and a phrase to be inserted Y that is or are identified by the text identifier 114. The concept of the "information transmitter" also includes the transmitter 130 that transmits the distribution information D to the terminal device 30 via the communication network 200, as well as the sound outputter 26 in accordance with the different embodiments.

Figure 14:
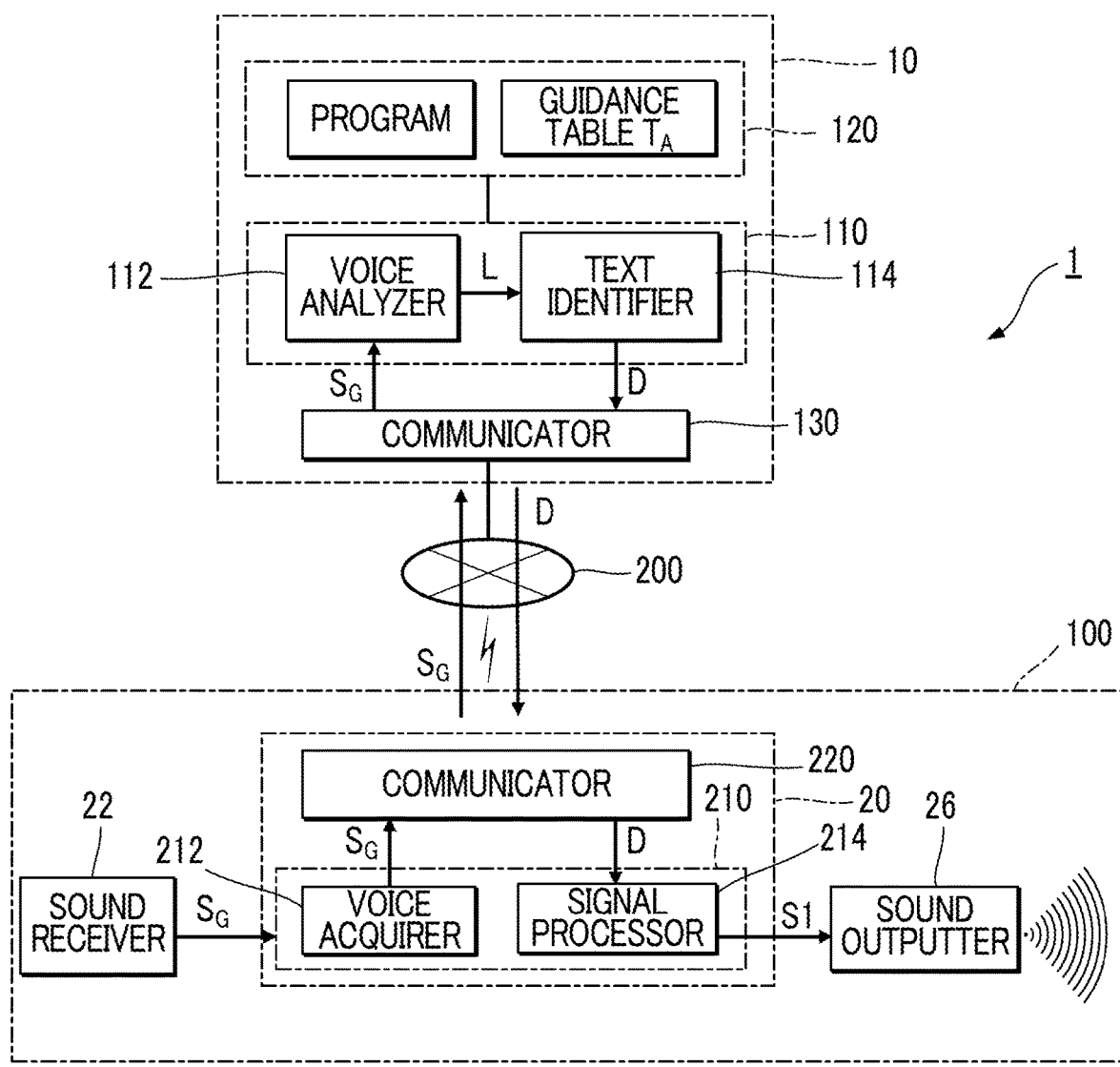
FIG. 14 is a block diagram of an information providing system according to a modification.

(11) In the embodiments described in the foregoing, the sound signal $S_G$ of the guidance voice V uttered by the operator $O_P$ and the audio signal $S_D$ including the distribution information D are added by the adder 24 provided externally to the distribution terminal 20. However, the sound signal $S_G$ and the audio signal $S_D$ may be added by the distribution terminal 20. For example, as shown in FIG. 14, the path from the sound receiver 22 to the sound outputter 26 may be omitted. The signal processor 214 of the distribution terminal 20 adds to the sound signal $S_G$ of the guidance voice V acquired from the sound receiver 22 by the voice acquirer 212 the audio signal $S_D$ of the distribution information D. The resulting audio signal $S_1$ is supplied to the sound outputter 26. In the configuration illustrated in FIG. 14, for example, the distribution terminal 20 may retain the sound signal $S_G$ and, after the generation of the distribution information D, may add the audio signal $S_D$ of the distribution information D and the sound signal $S_G$ it has retained, for supply to the sound outputter 26 (accordingly, the guidance voice V is output from the sound outputter 26 with a delay from the time point at which the operator $O_P$ utters the guidance voice V).

(12) The information providing system according to the above-mentioned embodiments may be realized as exclusive electric circuitry, or may be realized through cooperation between a general arithmetic processing unit, such as a CPU, and a program. A program according to the present invention may be provided in a format stored in a computer-readable recording medium and be installed in a computer. The recording medium is for example a non-transitory recording medium, and a preferable example thereof may be an optical recording medium (optical disc) such as a CD-ROM, but may also include a recording medium of a freely selected format that is publicly known, such as a semiconductor recording medium or a magnetic recording medium. It is of note that a "non-transitory" recording medium according to the present description includes all computer-readable recording media except transitory, propagating signals, and it does not exclude volatile recording media. The program of the present invention may for example be provided in a format distributed via a communication network and be installed in a computer. Furthermore, the present invention may also be identified as an operational method (information providing method) of the information providing system according to any one of the previously presented embodiments.

Different aspects and modes of the invention may be derived from the embodiments and modifications described in the foregoing.

In one aspect, an information providing system of the present invention includes a sound receiver configured to receive a guidance voice and to generate a sound signal, a text identifier configured to identify, from among a plurality of registered texts representing contents of utterances of different guidance voices, a registered text that is similar to an uttered text that has been obtained by analyzing the sound signal by use of speech recognition, and an information transmitter configured to transmit distribution information that indicates the registered text identified by the text identifier to a terminal device, wherein the terminal device is configured to present to a user guidance information corresponding to the distribution information from among a plurality of pieces of guidance information that correspond to the respective guidance voices. By this configuration, distribution information that indicates a registered text that is similar to the uttered text of the guidance voice received by the sound receiver is transmitted to the terminal device, from among the plurality of registered texts that each represent content of an utterance of one of the guidance voices. In this way, it is possible to present to the user of the terminal device appropriate guidance information that does not contain speech recognition errors, in contrast to a configuration in which an uttered text that is obtained by analyzing received sound signals by use of speech recognition is provided to the terminal device.

According to a preferred mode, the information providing system additionally includes a signal processor configured to generate an audio signal of a sound including the distribution information, and the information transmitter includes a sound outputter configured to output the guidance voice received by the sound receiver and a sound of the audio signal generated by the signal processor. By this configuration, the sound outputter that outputs the guidance voice received by the sound receiver is also used for outputting a sound including the distribution information (i.e., sound communication that uses sounds as in aerial vibration as a transmission medium). Therefore, it is possible to simplify the configuration of the information providing system in comparison with a configuration in which the distribution information is transmitted to the terminal device separately from the output of the guidance voice. In a configuration in which the information transmitter transmits, as the distribution information, identification information of the registered text identified by the text identifier, it is possible to appropriately transmit the distribution information to the terminal device by sound communication that tends to have a lower transmission capacity compared to radio communication that uses magnetic or electric waves as the transmission medium.

In another preferable example, the terminal device includes a storage unit configured to store the plurality of pieces of guidance information, and a presenter configured to present to the user, from among the plurality of pieces of guidance information, guidance information that corresponds to the distribution information transmitted from the information transmitter. In this configuration, guidance information that corresponds to the distribution information transmitted from the information transmitter, from among the plurality of pieces of guidance information stored in the storage unit of the terminal device, is presented to the user of the terminal device. Consequently, this configuration has an advantage in that there is no need for the terminal device to perform communication via a communication network for the purpose of acquiring the guidance information.

In yet another preferable mode, the text identifier identifies the registered text that is similar to the uttered text from among the plurality of registered texts and also identifies a phrase to be inserted that is similar to a portion corresponding to an insertion section that is within the uttered text from among a plurality of phrases to be inserted into the insertion section set within the registered text, and the information transmitter transmits to the terminal device distribution information that indicates the registered text and the phrase to be inserted identified by the text identifier. In this configuration, a phrase to be inserted is identified that is similar to the portion corresponding to the insertion section within the uttered text, from among the plurality of phrases that may be inserted into the insertion section that has been set within the registered text. Then, the distribution information that indicates the registered text and the phrase to be inserted are transmitted to the terminal device. Therefore, in a situation in which different kinds of guidance voices are output, and which are obtained by inserting different phrases into a fixed text, it is possible to present to the user of the terminal device guidance information that corresponds to the different guidance voices that have different phrases inserted, without a need to prepare separate registered texts for different guidance voices.

In still yet another preferable mode, the terminal device includes a storage unit configured to store the plurality of registered texts and the plurality of phrases to be inserted, a guidance information generator configured to generate guidance information that is obtained by inserting the phrase to be inserted indicated by the distribution information, from among the plurality of phrases to be inserted stored in the storage unit, inserted into the insertion section within the registered text indicated by the distribution information transmitted from the information transmitter from among the plurality of registered texts stored in the storage unit, and a presenter configured to present to the user guidance information generated by the guidance information generator. By this configuration, the guidance information generator of the terminal device generates guidance information that has a phrase to be inserted and which is indicated by the distribution information inserted into a registered text indicated by the distribution information, from among the plurality of registered texts and the plurality of phrases to be inserted that are stored in the storage unit of the terminal device. Therefore, this configuration has an advantage in that there is no need for the terminal device to perform communication via a communication network for the purpose of acquiring guidance information.

In still yet another preferable mode, the text identifier selects a phrase to be inserted (or, a phrase to be inserted and a registered text) by referring to status information that represents a status of an object on which guidance is to be provided by the guidance voice. In this configuration, the phrase to be inserted (or, a phrase to be inserted and a registered text) is selected based on its similarity to the uttered text, as well as the status of the object of guidance. Therefore, it is possible to present to the user of the terminal device accurate guidance information in which there is taken into account an actual status of the object of guidance.

In another aspect, the information providing device according to the above-mentioned embodiments may also be realized as an information providing method that executes processes according to the different functions of the information providing device. In still another aspect, the information providing device may be realized as a program that causes a computer to execute such a method. More specifically, the information providing method in a computer system according to one aspect of the present invention includes receiving a guidance voice and generates a sound signal, identifying, from among a plurality of registered texts representing contents of utterances of different guidance voices, a registered text that is similar to an uttered text that has been obtained by analyzing the sound signal by use of speech recognition, and transmitting distribution information that indicates the registered text identified by the text identifier to a terminal device, wherein the terminal device is configured to present to a user guidance information corresponding to the distribution information from among a plurality of pieces of guidance information that correspond to the respective guidance voices.

Furthermore, a program according to one aspect of the present invention causes a computer to execute a sound reception process of receiving a guidance voice and generates a sound signal, a text identification process of identifying, from among a plurality of registered texts representing contents of utterances of different guidance voices, a registered text that is similar to an uttered text that has been obtained by analyzing the sound signal by use of speech recognition, and an information transmission process of transmitting distribution information that indicates the registered text identified by the text identifier to a terminal device, wherein the terminal device is configured to present to a user guidance information corresponding to the distribution information from among a plurality of pieces of guidance information that correspond to the respective guidance voices. By this information providing method or the program, substantially the same effects as those attained by the information providing device are attained. The program according to the present invention may be installed in a computer in a computer-readable format on computer-readable recording media.

DESCRIPTION OF REFERENCE SIGNS

1 . . . information providing system, 10 . . . management device, 30 . . . terminal device, 100 . . . voice guidance system, 110 . . . controller, 112 . . . voice analyzer, 114 . . . text identifier, 120 . . . storage unit, 130 . . . communicator, 20 . . . distribution terminal, 22 . . . sound receiver, 24 . . . adder, 26 . . . sound outputter, 210 . . . controller, 212 . . . voice acquirer, 214 . . . signal processor, 220 . . . communicator, 310 . . . sound receiver, 320 . . . controller, 322 . . . information extractor, 324 . . . information manager, 330 . . . storage unit, 340 . . . presenter

What is claimed is:

1. An information providing system comprising:
a sound receiver configured to receive a guidance voice and generate a sound signal;
a text identifier configured to:
identify, from among a plurality of registered sentences representing contents of utterances of different guidance voices, a registered sentence that is similar to an uttered text that has been obtained by analyzing the sound signal using speech recognition; and
identify a phrase to be inserted that is similar to a portion corresponding to an insertion section that is within the uttered text from among a plurality of phrases to be inserted that are insertable into the insertion section set within the identified registered sentence; and
an information transmitter configured to transmit distribution information that indicates the registered sentence and the phrase to be inserted identified by the text identifier to a terminal device,
wherein the terminal device is configured to present to a user guidance information corresponding to the distribution information from among a plurality of pieces of guidance information that corresponds to the respective guidance voices.

2. The information providing system according to claim 1, further comprising:
a signal processor configured to generate an audio signal of a sound including the distribution information,
wherein the information transmitter comprises a sound outputter configured to output the guidance voice received by the sound receiver and a sound of the audio signal generated by the signal processor.

3. The information providing system according to claim 1, wherein the terminal device comprises:
a storage unit configured to store the plurality of pieces of guidance information; and
a presenter configured to present to the user, from among the plurality of pieces of guidance information, guidance information that corresponds to the distribution information transmitted from the information transmitter.

4. The information providing system according to claim 1, wherein the terminal device comprises:
a storage unit configured to store the plurality of registered sentences and the plurality of phrases to be inserted;
a guidance information generator configured to generate guidance information that is obtained by inserting the phrase to be inserted indicated by the distribution information, from among the plurality of phrases to be inserted stored in the storage unit, the phrase being inserted into the insertion section within the registered sentence indicated by the distribution information transmitted from the information transmitter from among the plurality of registered sentences stored in the storage unit; and
a presenter configured to present to the user guidance information generated by the guidance information generator.

5. The information providing system according to claim 1, wherein the text identifier selects the phrase to be inserted by referring to status information that represents a status of an object based on which guidance is to be provided by the guidance voice.

6. The information providing system according to claim 1, wherein the text identifier selects the registered sentence by referring to status information that represents a status of an object on which guidance is to be provided by the guidance voice.

7. An information providing method in a computer system, the method comprising:
   receiving a guidance voice and generating a sound signal;
   identifying, from among a plurality of registered sentences representing contents of utterances of different guidance voices, a registered sentence that is similar to an uttered text that has been obtained by analyzing the sound signal using speech recognition;
   identifying a phrase to be inserted that is similar to a portion corresponding to an insertion section that is within the uttered text from among a plurality of phrases to be inserted that are insertable into the insertion section set within the identified registered sentence; and
   transmitting distribution information that indicates the identified registered sentence and the phrase to be inserted identified by the identifying of the phrase to a terminal device,
   wherein the terminal device is configured to present to a user guidance information corresponding to the distribution information, from among a plurality of pieces of guidance information that correspond to the respective guidance voices.

8. The information providing method according to claim 7, further comprising:
   generating an audio signal of the sound including the distribution information; and
   outputting the guidance voice and the sound of the audio signal.

9. The information providing method according to claim 7, the identifying of the phrase identifies the phrase to be inserted by referring to status information that represents the status of an object on which guidance is to be provided by the guidance voice.

10. The information providing method according to claim 7, the identifying of the registered sentence selects the registered sentence by referring to status information that represents the status of an object of guidance for the guidance voice.

11. A non-transitory computer-readable recording medium storing a program executable by a computer to execute a method comprising:
   receiving a guidance voice and generating a sound signal;
   identifying, from among a plurality of registered sentences representing contents of utterances of different guidance voices, a registered sentence that is similar to an uttered text that has been obtained by analyzing the sound signal using speech recognition;
   identifying a phrase to be inserted that is similar to a portion corresponding to an insertion section that is within the uttered text from among a plurality of phrases to be inserted that are insertable into the insertion section set within the identified registered sentence; and
   transmitting distribution information that indicates the identified registered sentence and the phrase to be inserted identified by the identifying of the phrase to a terminal device,
   wherein the terminal device is configured to present to a user guidance information corresponding to the distribution information, from among a plurality of pieces of guidance information that correspond to the respective guidance voices.

* * * * *